US011810181B2

(12) United States Patent
McKechnie et al.

(10) Patent No.: US 11,810,181 B2
(45) Date of Patent: Nov. 7, 2023

(54) COMPUTERIZED INTERACTIVE EYEWEAR DISPLAY BOARD SYSTEM

(71) Applicant: BEIJING ZITIAO NETWORK TECHNOLOGY CO., LTD., Beijing (CN)

(72) Inventors: William McKechnie, West Sacramento, CA (US); Timothy John Wickham, Sacramento, CA (US); Anna Lee Plaxco, Sacramento, CA (US); Kevin Harbart, Sacramento, CA (US); Matthew Allen Workman, Sacramento, CA (US); Shaun Garland, Sacramento, CA (US); Richard Chester Klosinski, Jr., Sacramento, CA (US); Jay William Sales, Citrus Heights, CA (US)

(73) Assignee: BEIJING ZITIAO NETWORK TECHNOLOGY CO., LTD., Bejing (CN)

( * ) Notice: Subject to any disclaimer, the term of this patent is extended or adjusted under 35 U.S.C. 154(b) by 367 days.

(21) Appl. No.: 15/885,609

(22) Filed: Jan. 31, 2018

(65) Prior Publication Data

US 2018/0218442 A1    Aug. 2, 2018

Related U.S. Application Data

(60) Provisional application No. 62/452,876, filed on Jan. 31, 2017.

(51) Int. Cl.
*G06Q 30/00* (2023.01)
*G06Q 30/0601* (2023.01)
*G06K 7/10* (2006.01)

(52) U.S. Cl.
CPC ..... *G06Q 30/0639* (2013.01); *G06K 7/10297* (2013.01)

(58) Field of Classification Search
None
See application file for complete search history.

(56) References Cited

U.S. PATENT DOCUMENTS 7,118,036 B1    10/2006   Couch et al.
9,740,897 B1 *   8/2017   Salour ............... G06K 7/10316
(Continued)

FOREIGN PATENT DOCUMENTS

CN    202198220    4/2012
WO   20090112871   9/2009

OTHER PUBLICATIONS

Method to Track Inventory Through the Use of Weight Sensitive Smart Shelving, Nov. 17, 2014, The IP.com Prior Art Database (Year: 2014).*

*Primary Examiner* — Allison G Wood
*Assistant Examiner* — Timothy J Kang (57) ABSTRACT

A computerized, interactive eyewear display board system, comprising a plurality of display shelves mounted to a display board's support structure, each of the display shelves comprising at least one light that is adapted to selectively illuminate the respective shelf, the at least one light being controlled a computer processor; and an item tracking mechanism that is adapted to determine which particular eyewear is on each particular respective one of the display shelves. In various embodiments, the display board system is adapted to receive eyewear preference criteria from a user, identify particular eyewear that is placed on a particular one of the display shelves that satisfies the eyewear preference criteria, and in response to determining that the particular eyewear satisfies the eyewear preference criteria, illuminate the particular shelf.

11 Claims, 4 Drawing Sheets

(56) References Cited

U.S. PATENT DOCUMENTS

| | | | |
|---|---|---|---|
| 2005/0256782 A1 | 11/2005 | Sands et al. | |
| 2013/0088490 A1* | 4/2013 | Rasmussen | G06T 19/006 |
| | | | 345/421 |
| 2015/0206188 A1* | 7/2015 | Tanigawa | G06Q 30/0261 |
| | | | 705/14.58 |
| 2015/0278928 A1 | 10/2015 | Nichols et al. | |
| 2015/0294398 A1* | 10/2015 | Khalid | G06Q 30/0631 |
| | | | 705/26.7 |
| 2016/0048798 A1* | 2/2016 | Meyer | G01G 19/4144 |
| | | | 705/28 |
| 2016/0055566 A1* | 2/2016 | Otani | G06Q 30/0631 |
| | | | 705/7.29 |
| 2016/0180404 A1* | 6/2016 | Stern | G06Q 30/0261 |
| | | | 705/14.58 |
| 2016/0313959 A1* | 10/2016 | Abell | G06Q 30/02 |
| 2019/0188784 A1* | 6/2019 | Bleicher | G06F 16/00 |

\* cited by examiner

COMPUTERIZED INTERACTIVE EYEWEAR DISPLAY BOARD SYSTEM

CROSS-REFERENCE TO RELATED APPLICATION

This application claims priority to U.S. Provisional Patent Application Ser. No. 62/452,876, filed Jan. 31, 2017, entitled "Computerized Interactive Eyewear Display Board," the disclosure of which is hereby incorporated by reference herein in its entirety.

BACKGROUND

Currently, it is difficult for an individual to research eyewear and then purchase the eyewear identified in the individual's search in a brick-and-mortar store. One reason for this is that, at any given time, retail establishments that sell eyewear often have a large number of different pairs of eyewear on display at the same time. Because some brands and styles of eyewear may look similar to customers, it may be difficult for individuals to scan a room full of tens or hundreds of pairs of eyewear and quickly identify the particular eyewear that they have researched and are interested in.

This issue is exacerbated by the fact that individuals often don't return eyewear to its original dedicated display shelf after trying it on. This can result, for example, in a particular pair of eyewear being moved far out of place over the course of a particular business day or week as multiple users pick up and try on the eyewear.

Accordingly, there is a need for improved systems and methods for displaying eyewear and helping users identify particular eyewear (e.g., a particular pair of eyewear) within a retail (or other) environment.

SUMMARY

A computerized, interactive eyewear display board system, according to various embodiments, comprises: (1) at least one computer processor; (2) memory operatively coupled to the at least one computer processor; (3) a display board comprising: (a) a support structure; (b) a plurality of display shelves mounted to the display board's support structure, each of the display shelves comprising at least one light that is adapted to selectively illuminate the respective shelf, the at least one light being controlled by the at least one computer processor; and (c) an item tracking mechanism that is adapted to determine which particular eyewear (e.g., which particular pair of glasses, goggles, or other eyewear) is on each particular respective one of the display shelves, wherein the display board system is adapted to: (1) receive eyewear preference criteria from a user; (2) identify particular eyewear that is placed on a particular one of the display shelves that satisfies the eyewear preference criteria; and (3) in response to determining that the particular eyewear satisfies the eyewear preference criteria, illuminate the particular shelf.

OVERVIEW

A computerized, interactive eyewear display board, according to various embodiments, is adapted to communicate with a mobile computing device (e.g., a smartphone or tablet computer) of one or more users. The display board may include multiple shelves for supporting respective individual pairs of eyewear and one or more lights (e.g., LEDs or other lights) adjacent each of the shelves. The system may also include a respective RFID or NFC reader adjacent each of its respective shelves that may be used to determine—e.g., by scanning an RFID or NFC tag attached to, or embedded within, eyewear on the shelf—which brand and model of eyewear is currently on the shelf. In particular embodiments, the system is adapted to receive one or more particular characteristics of eyewear from a mobile computing device and then, using the respective LED's, light up one or more respective shelves holding eyewear that matches the one or more particular characteristics. For example, if a user specifies, on their handheld device, that they are interested in Dragon eyewear frames, the display board may, in response, use the LED's to illuminate any shelves, on the eyewear display board, that are currently supporting Dragon frames. This may be useful, for example, in helping users to quickly identify eyewear that meets their specified criteria.

The system may be adapted to allow a user to use software (e.g., an app or other software) on their mobile computing device to select particular eyewear (e.g., after using the app to virtually try on the pair of eyewear). When the system determines that the user has entered a particular store and/or is close to a display that includes the user's previously-selected eyewear, the app directs the user to the particular display that features the eyewear. The system then uses LED's, as described above, to light up the shelf that holds the selected eyewear. The system may optionally use Beacon technology, or other location determination technology, to determine that a user has entered a store and/or is proximate a display that is supporting a particular pair of eyewear that the user placed in the user's virtual cart. This same functionality may be used to identify eyewear, to a user, that satisfies one or more criteria specified by a user or determined automatically by the system.

In particular embodiments, the system is adapted to determine (e.g., using one or more RFID or NFC tags associated with various pairs of eyewear) whether each respective pair of eyewear is on its correct shelf. (The system may do this, for example, by comparing the current location of each pair of eyewear with the intended location of the eyewear obtained from an electronic planogram for the display board.) If the system isn't on its correct shelf, the system may use the LED indicators on the display board to show which eyewear is out of place, and also to show where to place eyewear that was previously identified as out of place. For example, the system may light a red LED next to any eyewear that is currently on an incorrect shelf. In response to the user picking up that pair of eyewear, the system may light a green LED on the correct shelf for the pair of eyewear. This essentially tells the user to move the eyewear from the red shelf to the green shelf.

In various embodiments, the system is adapted to provide the user with information about particular eyewear when the user picks up the particular eyewear from a shelf. For example, in various embodiments, in response to the user picking up eyewear from a particular shelf of the display board, the system may display information regarding the eyewear (e.g., the brand, style, size, price of the eyewear, etc.). Various embodiments are described in greater detail below.

BRIEF DESCRIPTION OF THE DRAWINGS

Various embodiments of a computerized, interactive eyewear display board and related systems and methods are described below. In the course of this description, reference will be made to the accompanying drawings, which are not necessarily drawn to scale, and wherein.

DETAILED DESCRIPTION OF VARIOUS EMBODIMENTS

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Example System Architecture

Figure 1:
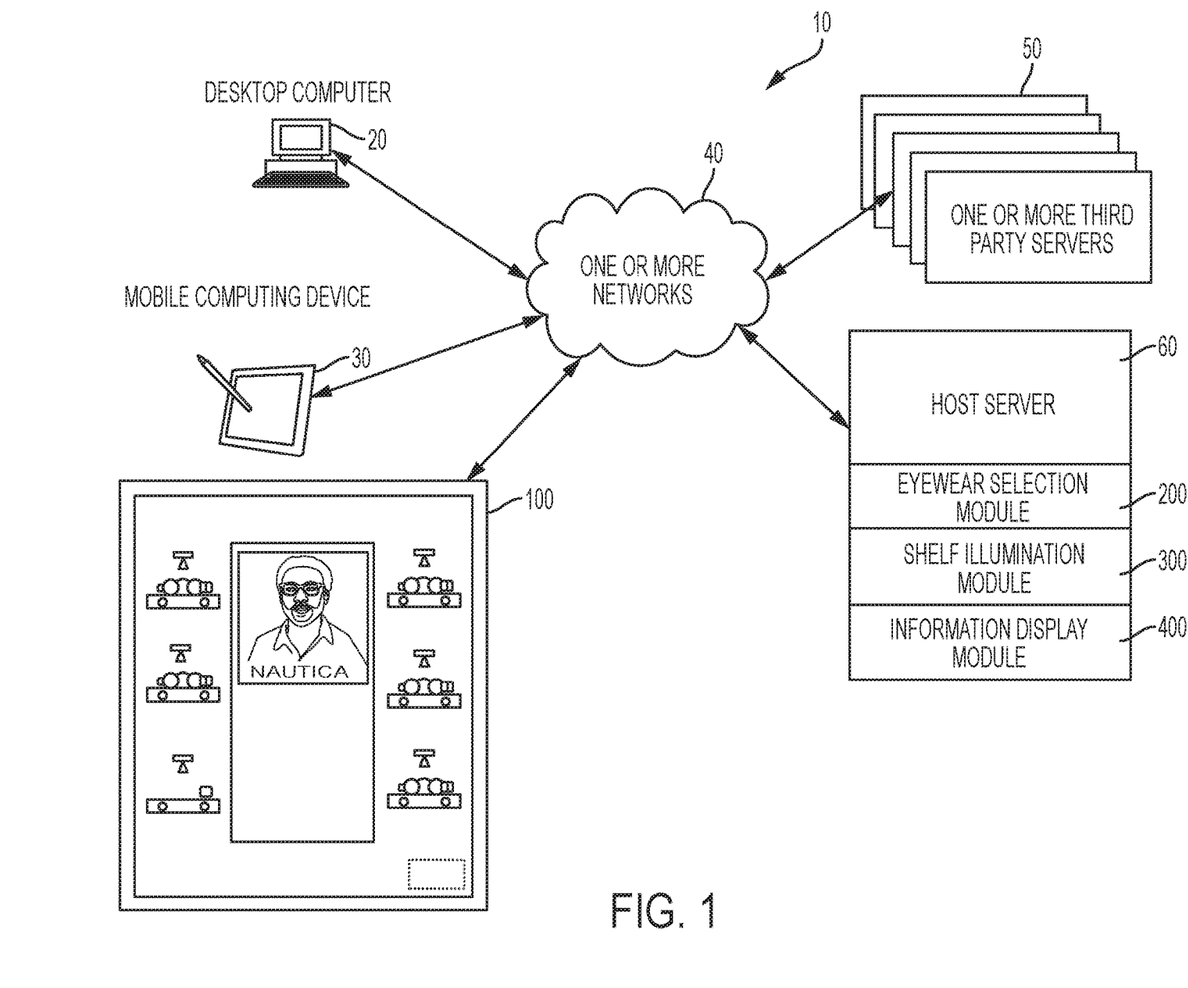
FIG. 1 is a block diagram of an interactive eyewear display system in accordance with an embodiment of the present system.

FIG. 1 is a block diagram of an interactive eyewear display system 10 according to a particular embodiment. As may be understood from this figure, the interactive eyewear display system 10 includes one or more computer networks 40, one or more Host Servers 60, one or more Third-Party Severs 50, one or more remote computing devices such one or more a desktop computers 20, one or more mobile computing devices 30 (e.g., one or more smartphones or tablet computers, etc.) and one or more interactive eyewear display boards 15. In particular embodiments, the one or more computer networks facilitate communication between the Host Servers 60, the one or more Third-Party Severs 50, the one or more remote computing devices and/or the one or more interactive eyewear display boards 15. The system may also comprise one or more data structures (e.g., databases) that may be stored on any of the computing devices described above, or any other suitable computing device. The one or more databases may include, for example, one or more databases that specify the model names and attributes of various eyewear to be displayed on the interactive eyewear display boards 15.

The one or more computer networks 40 may include any of a variety of types of wired or wireless computer networks such as the Internet, a private intranet, a public switch telephone network (PSTN), or any other type of network.

Figure 2:
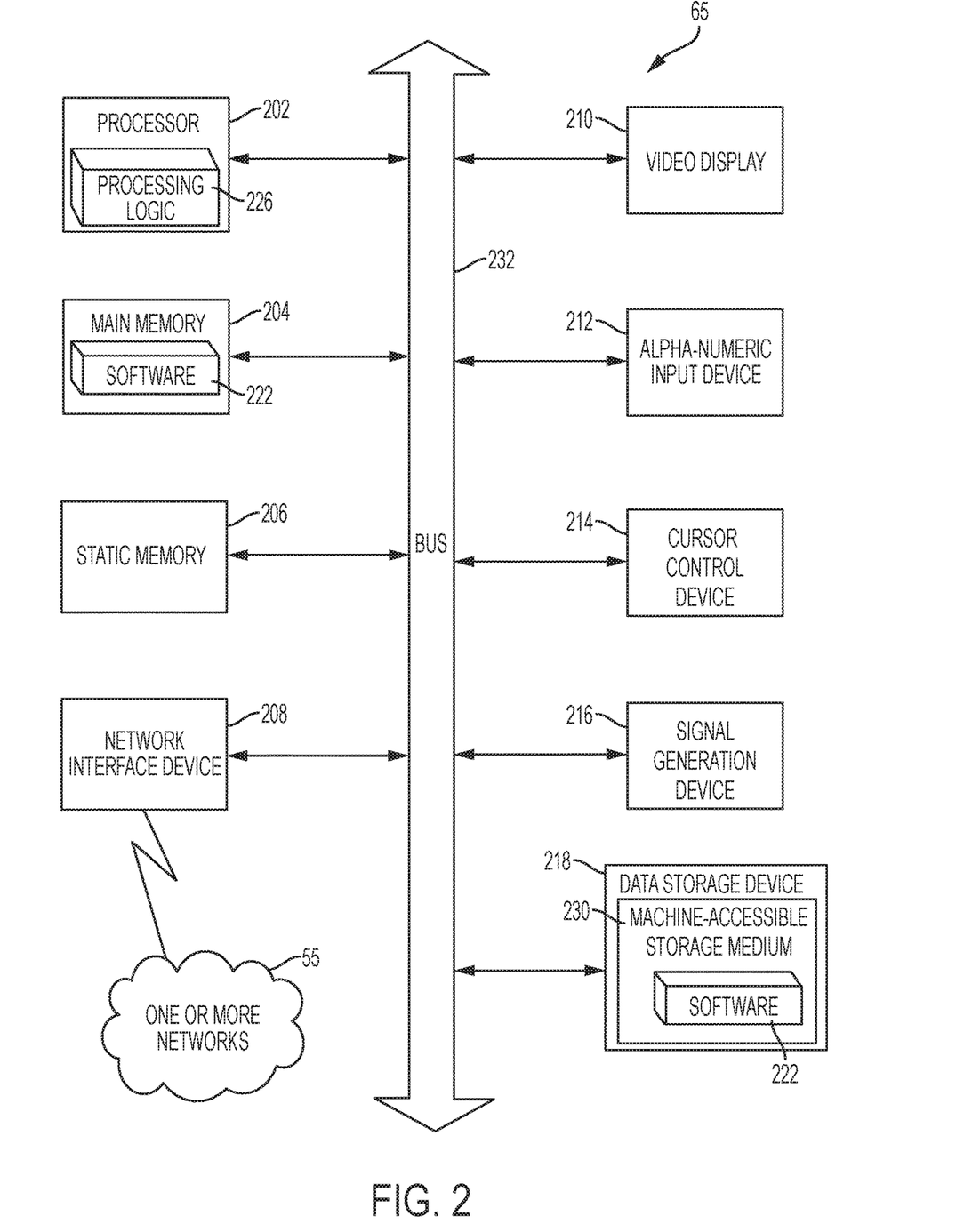
FIG. 2 is a schematic diagram of a computer, such as the display-board onboard computer of FIG. 1, that is suitable for use in various embodiments.

FIG. 2 is a diagrammatic representation of an example computer architecture that may be used within any of the computing devices described herein. In this example, the computer architecture is shown as the computer architecture of the onboard computer of the display board 15 of FIG. 1, but the technical aspects described within this section may apply, in various embodiments, to any of the other computing devices described herein.

In particular embodiments, the computer 65 may be connected (e.g., networked) to other computers in a LAN, an intranet, an extranet, and/or the Internet. As noted above, the computer 65 may operate in the capacity of a server or a client computer in a client-server network environment, or as a peer computer in a peer-to-peer (or distributed) network environment. The Computer 65 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 65 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein. The computer may also include suitable hardware for communing via Bluetooth, Near Field Communications (NFC), or any other suitable wireless communication protocol.

The computer 65 may further include a network interface device 208. The computer 65 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within main memory 204 and/or within processing device 202 during execution thereof by the computer 65—main memory 204 and processing device 202 also constituting computer-accessible storage media. The software 222 may further be transmitted or received over a network 55 (which may be one of the one or more networks 40 of FIG. 1) via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc. In the course of this specification and claims, computer-accessible storage mediums may be referred to by slight variations in this terminology, such as "computer-readable medium", etc.

Computerized Eyewear Display Board

Figure 3:
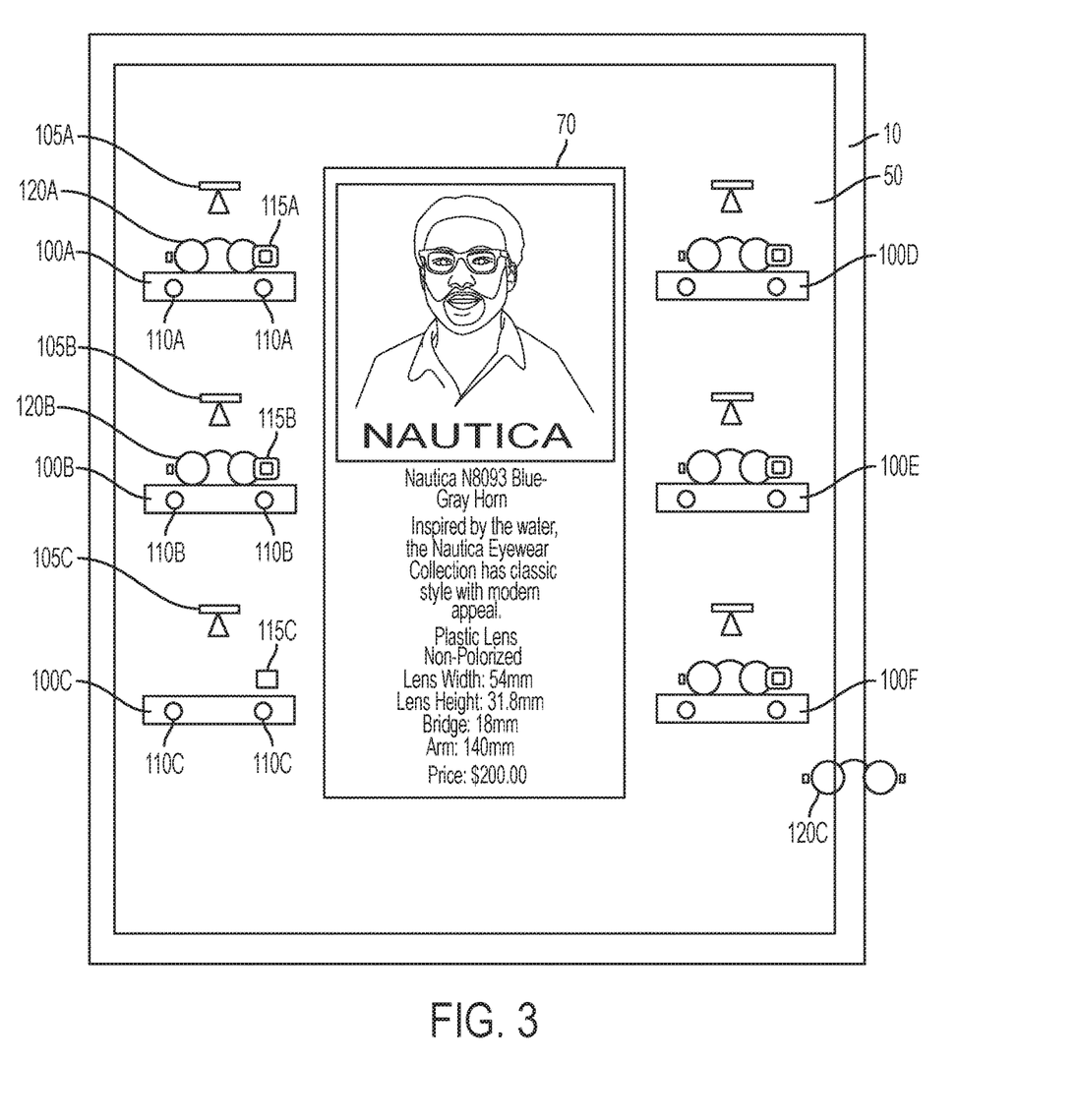
FIG. 3 is a plan view of an interactive eyewear display board according to particular embodiments.

FIG. 3 shows an example computerized eyewear display board 15 according to various embodiments. As may be understood from this figure, the display board 15 comprises a support structure 50 that may include, for example, a substantially planar rear wall and suitable mounts and/or supports for either mounting the display board to the interior wall of a building (e.g., the wall of an optician's office), or supporting the eyewear display board 15 in a freestanding upright position. The support structure 102 may be made of any suitable material, such as wood, metal, fiberglass, plastic, or any other suitable material (e.g., that is strong and rigid enough to support the shelves 100A-100F of the eyewear display board 15 and other components that are mounted to the display board 15).

As shown in FIG. 3, the eyewear display board 15 comprises a plurality of display shelves 100A-100F. In particular embodiments, the display shelves are substantially planar, rigid, and are each respectfully dimensioned to support a pair of standard eyewear when the eyewear's temples are extended. In a particular embodiment, each of the shelves is made at least substantially of a transparent or semi-transparent material (e.g., semi-transparent plastic), which may allow one or more electric lights to selectively illuminate the shelf (e.g., by shining light into the interior of the shelf). This may result in the shelf exhibiting a glowing effect. In various embodiments, the electric lights may be adapted to illuminate the shelves in any one of a plurality of different light intensities.

In this regard, in the embodiment shown in FIG. 3, the display board 15 includes one or more (in this example, two) LED lights 110A-110C (e.g., color LED lights that may be selectively illuminated in any of a plurality of different colors), or other suitable lights, that are mounted within or immediately adjacent each shelf 100A-100F. As noted above, the lights 110A-110C are positioned so that, when a particular pair of lights 110A-110C is turned on, the lights internally illuminate the shelf 100A-100F adjacent which (or within which) the lights 110 are positioned. In the embodiment shown, when the lights are turned on, the lights only illuminate the shelf that they are positioned adjacent (or within).

The eyewear display board 15 further comprises a plurality of overhead lamps 105A—105C that are each respectively positioned to selectively illuminate a respective one of the shelves 100A-100F. This may be helpful in calling attention to the shelf or in simply illuminating eyewear displayed on the shelf.

In particular embodiments, the eyewear display board 15 may also include a plurality of RFID readers 115A-115C, each respective one of which is positioned on a wall above a respective one of the shelves 100A-100F so that when a pair of eyewear is positioned on the respective shelf, an RFID tag attached to (or disposed within) the eyewear (e.g., the end portion of the temple of the eyewear) is disposed a short distance from (e.g., within about 3 inches of) a respective RFID reader 115A-115C. This is demonstrated in FIG. 3 as eyewear 120A is in such a position in respect to RFID reader 115A, and eyewear 120B is in such a position in respect to RFID reader 115B. It should be understood that the system may use NFC tags/readers in place of, or in addition to, the RFID tags/readers described above.

The display board 15 may also include an onboard computer 103 (See FIG. 1, e.g., a raspberry PI computer or other suitable computer) that is operably connected to various components, such as an electronic display 70, which may be, for example, a touch screen or non-touch screen computer monitor, such as a flat-screen LED display. The onboard computer 103 may also include suitable hardware for communicating via Bluetooth, Near Field Communications (NFC), or any other wireless communications protocol(s).

In various embodiments, the internal computer 103 is adapted to selectively receive information from a user regarding eyewear that the user is interested in. The system may then reference a suitable database (e.g., storing information indicating which eyewear is currently stored on each of the display board's shelves, along with information regarding each respective pair of eyewear—such as the brand, size, model number, color, and price of the eyewear) to identify any eyewear on its shelves that matches the user's specified "of interest" criteria. For example, if the user specifies (as discussed below) that they are interested in trying on Nautica eyewear, the system may search its memory to determine whether any Nautica eyewear is displayed on its shelves.

If the system determines (e.g., using the RFID/NFC readers as discussed elsewhere herein, in conjunction with one or more suitable databases of eyewear information) that eyewear meeting the user's "of interest" criteria is on its shelves, the system may illuminate the shelves that are currently supporting those "of interest" eyewear (e.g., by turning on the appropriate LED lights 110A-110C that are disposed adjacent or within those shelves). This may help the user to quickly identify the eyewear that they are looking for.

Example Operation of System

The operation of a particular embodiment of the system will now be described. It should be understood that the operational features described below may be implemented in other embodiments, and that certain steps or features may also be optionally omitted in variations of the embodiments described herein.

Input of User Eyewear Preferences

The system may be adapted to allow a user to input their preferences regarding eyewear (also referred to herein as "Of Interest" Criteria) in any suitable way. For example, the user may use a suitable graphical user interface on the display board's touch screen 70 to input their eyewear preferences. For example, the user may use a suitable GUI interface to specify that they are interested in teardrop-shaped blue eyewear by Nautica or Lacoste.

The system may be further, or alternatively, adapted to allow a user to use their mobile computing device 30 (e.g., a smartphone or tablet computer) and/or a desktop computer 20 to enter their eyewear preferences via a suitable interface, such as a graphical user interface. The user may do this either at a retail location where the display board 15 is located, or at a location (e.g., the user's home or office) that is remote from such a retail location. For example, the user may use a suitable software application (e.g., an "app") on their smartphone while they are at home to enter their eyewear preferences, and or to flag particular eyewear models as "of interest". In particular embodiments, the user may specify particular eyewear models as being "of interest" by adding those models to the user's shopping cart on a website or within a suitable app. In particular embodiments, the website or app may include a virtual try-on program that allows users to virtually "try on" eyewear. Such programs create computer-generated images of the user "wearing" selected eyewear by superimposing images of the eyewear over the face of the user so that it looks like the user is wearing the eyewear.

In certain embodiments, rather than having the user select eyewear that is of interest, the system may include eyewear selection software for automatically selecting eyewear that may appeal to the user. Such software may be adapted, for example, to scan the user's face or an image of the user's face to determine the user's facial structure (e.g., dimensions of the user's eyes, nose, ears, head, face, etc.). The system may use this information, optionally in combination with user preferences specified by the user and/or other information obtained about the user (e.g., information from social medial web sites, browsing history information, musical taste information, etc.) to automatically generate a list of eyewear characteristics that are suitable to the user. For example, the system may determine, based on the user's facial dimensions, recent shopping history, and user-created Spotify playlists that thin, metal, circular eyewear frames would suit the user's personality and facial structure. The system may then optionally identify any frames (e.g., from within a suitable database of eyewear frames) that match these automatically generated criteria and save those frames as "of interest" frames to the user's profile.

Illumination of Shelves and Display of Eyewear Information

The system may operate to bring the user's attention to particular suitable eyewear models, and to display information regarding those models, in any of a variety of ways. For example, the system may retrieve user eyewear preference information in any of the ways discussed above and, for example, perform as indicated below.

When a user enters a retail establishment that has a one or more display boards 15 on-site, the system determines that the user has arrived and, in response to determining that the user has arrived, informs the user which particular display boards include eyewear that satisfies the user's "of interest" criteria. The system may do this by, for example, displaying a map of the store on the user's portable computing device (e.g., smartphone or tablet) and highlighting, on the map, the location of any display boards that include eyewear that the user is interested in. The system may also show, on the display of the user's portable computing device, images of the models of eyewear that are available on each respective display board so that the user knows which display boards are displaying the models that the user is most interested in. Alternatively, or in addition, the system may illuminate (e.g., in a color that has been designated by the user, or that is otherwise at least locally unique to the user) any display boards that are supporting models of eyewear that satisfy the user's "of interest" criteria. Alternatively, or in addition, the system may illuminate the respective shelves of any eyewear within the store (e.g., in a particular color of light that is at least locally unique to the user) that satisfy the user's "of interest" criteria.

In embodiments where the system doesn't immediately illuminate any display board shelves that are supporting "of interest" when the user enters the retail establishment, the system may illuminate any shelves of a particular display board that are supporting "of interest" eyewear when the user moves within close proximity of (e.g., less than 10 feet from) the particular display board. This may help to bring the user's attention to nearby eyewear that satisfies the user's eyewear preferences without overwhelming the user with too many choices.

When a user picks up eyewear from a particular shelf (e.g., as detected in any suitable way, such as by the respective RFID reader 115A-115C adjacent the particular shelf, or with a camera disposed adjacent the display board 15), the system may display any suitable display information regarding the particular eyewear on the systems' electronic display 104. Alternatively, or in addition, the system may communicate suitable information regarding the particular information via any other suitable mechanism (e.g., by playing an audio file of information regarding the eyewear or by transmitting information regarding the eyewear to the user's mobile computing device.)

Detection of User Location and/or Behavior

The system may determine the location of the user in any suitable way. For example, the system may assume that the user's location is the location of the user's mobile computing device 30 and then use suitable mobile device location tracking techniques (e.g., GPS, cellphone tower triangulation techniques, NFC and/or beacon technologies, etc.) to determine the location of the user. Alternatively, or in addition, the system may use one or more cameras disposed on, adjacent, and/or near the display board 15 to determine the location and/or actions of the user.

Stocking Assistance Functionality

In particular embodiments, the system may be adapted to assist users in maintaining eyewear on the correct shelves, and in maintaining the correct inventory of eyewear within a particular retail location. In particular embodiments, in response to determining that a particular pair of eyewear has been placed on an incorrect shelf (e.g., via the RFID techniques described above or any other suitable techniques), the system may display a suitable alert to a user (e.g., by illuminating the shelf that the eyewear is currently on in a particular color—e.g., red—and/or displaying a suitable message to the user on the display board's electronic display 104). The system may also indicate the correct shelf for the eyewear (e.g., by illuminating the shelf that the eyewear should be placed on in a particular color—e.g., green—and/or displaying a suitable message to the user on the display board's electronic display 104). This may be useful in helping customers and/or salespeople maintain eyewear on their correct display shelves and in tracking inventory within a particular retail location.

In various embodiments, the system may store, in memory, a digital planogram indicating which particular eyewear frame should be stored on each particular shelf on a particular display board. The system may reference this digital planogram when determining whether a particular frame is out of place and/or which particular shelf the eyewear frame should be moved to.

Light Show Functionality

In various embodiments, the system may include software for using the system's various lights to create a light show. This may be advantageous in attracting attention to the system's display boards and attracting customers to a particular retail location.

Example System Modules

It should be understood that various aspects of the system's functionality may be implemented in one or more software modules. Examples of such modules include those listed below.

i. Eyewear Selection Module—Receives criteria from a user that may be used to identify eyewear that satisfies the certain criteria; may also allow individuals to simply select eyewear that they like.
ii. Shelf Illumination Module—Facilitates the illumination of the display board's shelves according to particular criteria; for example, this module may selectively light up shelves of eyewear that were previously selected, that match current or past search criteria, or light up to indicate where eyewear should be placed.
iii. Information Display Module—retrieves information regarding eyewear (e.g., from suitable eyewear databases) and displays it on the system's electronic display.

CONCLUSION

Although embodiments above are described in reference to display boards for displaying eyewear and for maintaining the inventory of eyewear, it should be understood that the display boards may be used in the context of displaying and/or maintaining the inventory of any other suitable items.

It should be understood that, in any of the embodiments described herein, the system may include a shelf illumination system that is adapted to illuminate any of the shelves of the display board in any appropriate manner. For example, the shelf illumination system may be adapted to selectively illuminate one or more of the shelves with varying intensity (e.g., at a first intensity of lighting at a first time and at a second intensity of lighting at a second time). This may be useful, for example, in communicating any suitable message to the user about an item on a particular shelf that is illuminated by the illumination system.

Additionally, in various embodiments, a respective panel behind each respective displayed eyewear may be illuminated to help distinguish a particular user's selection from selections of other users. For example, if two users are present, the system may be configured to illuminate a first particular vertical LED bar indicator within the panel adjacent a particular pair of eyewear a first color (e.g., RED) to indicate that the eyewear satisfies criteria provided by a first user. Similarly, the system may be configured to illuminate a second particular vertical LED bar indicator within the panel adjacent the particular pair of eyewear a second color (e.g., BLUE) to indicate that the eyewear satisfies criteria provided by a second user. If both the first and second users select the same eyewear, then the LED panel adjacent the eyewear will have both RED and BLUE bars illuminated.

Figure 4:
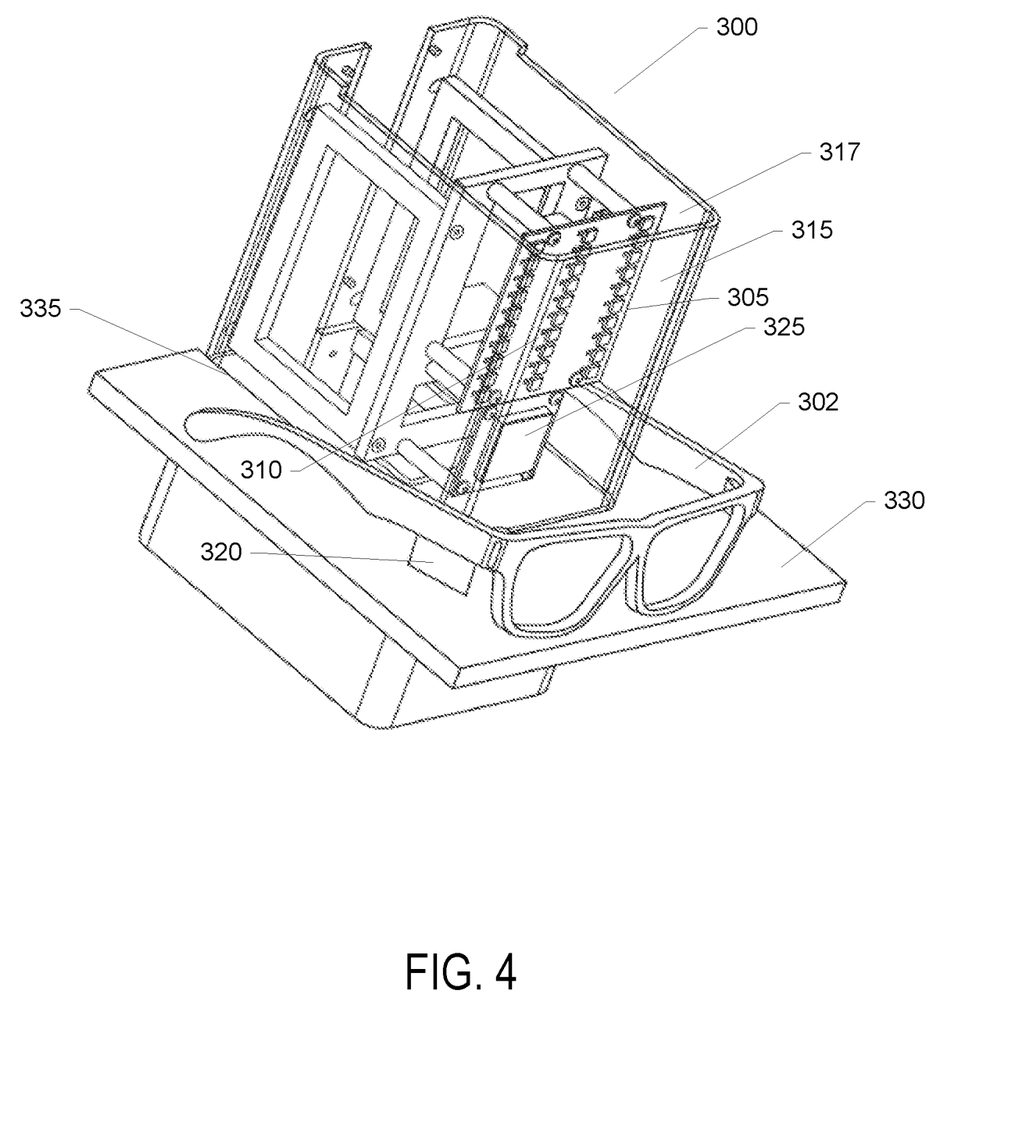
FIG. 4 is a perspective view of a display shelf and illumination arrangement according to a particular embodiment.

FIG. 4 is a perspective view of a shelf and illumination system arrangement 300 having multiple vertical LED bars 305, 310 within a panel assembly (including, for example, the optionally semi-transparent Acrylic White Sheet 315 of FIG. 4) as described above. As may be understood from this figure, in this embodiment: (1) an RFID tag 320 is attached to a temple of eyewear 302 as shown; (2) an RFID reader 325 (e.g., a UHF RFID Antenna) is positioned so that it is laterally positioned to at least generally align with a central portion of the eyewear's frame when the eyewear 302 is positioned on the shelf, as shown, so that the eyewear's temples are positioned on opposite sides of the panel assembly 317; (3) the shelf assembly 330 may include a shelf-level LED 335 for selectively illuminating the shelf 330 at any of a variety of different intensity levels. In particular embodiments, the RFID reader 325 and RFID tag 320 are selected and calibrated so that the RFID reader 325 only reads RFID tags 320 that are located immediately adjacent the shelf 330 (and not immediately adjacent similar, neighboring shelves).

This aspect of various embodiments may prevent the RFID reader 325 from reading RFID tags of eyewear that is not positioned on the shelf 330, which may be useful in assuring that the system tracks the correct shelf location of each pair of eyewear that is tracked by the system. Appropriate RF blocking material may be used between adjacent shelves, for example, to help prevent the system's respective RFID readers from reading the RFID tags of eyewear on similar, adjacent shelves.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

We claim:

1. A computerized, interactive eyewear display board system comprising:
   at least one computer processor;
   memory operatively coupled to the at least one computer processor;
   a display board comprising:
      a support structure;
      a plurality of display shelves mounted to the display board's support structure, each of the display shelves comprising an RFID reader and at least one light that is adapted to selectively illuminate the respective shelf, the at least one light being controlled by the at least one computer processor;
      an item tracking mechanism that is adapted to receive identification information from a plurality of eyewear on the plurality of display shelves via the respective RFID readers to determine which particular eyewear is on each particular respective one of the display shelves; and radio frequency blocking material separating adjacent display shelves of the plurality of display shelves; wherein the display board system is adapted to:

scan the user's face or an image of the user's face to determine a facial structure associated with the user;

receive data corresponding to the user, wherein the data corresponding to the user comprises of shopping or browsing history associated with the user, data from a social media web site associated with the user, and music data corresponding to a music program or music subscription associated with the user;

generate a list of eyewear characteristics that are suitable to the user according to the facial structure associated with the user and the data corresponding to the user;

receive eyewear preference criteria from a user, wherein receiving the eyewear preference criteria from the user comprises receiving the list of eyewear characteristics;

identify particular eyewear that is played on a particular one of the display shelves that satisfies the eyewear preference criteria, wherein a frame of the particular eyewear suits both the user's personality and facial structure; and in response to determining that the particular eyewear satisfies the eyewear preference criteria, illuminate the particular shelf, wherein illuminating the particular shelf comprises illuminating the particular shelf at a first intensity of lighting at a first time and at a second intensity of lighting at a second time, such that the particular eyewear is illuminated in a varying intensity manner and a message is communicated to the user about the particular eyewear on the particular shelf.

2. The system of claim 1, where the system is adapted to receive the eyewear preference criteria from a user's mobile computing device.

3. The system of claim 1, wherein the system is adapted to illuminate the shelf in response to determining that a user is proximate the display board.

4. The system of claim 1, wherein the system is adapted to:

determine that a user has entered a particular retail establishment that contains the display board; and in response to determining that the user has entered the retail establishment, providing instructions to the user regarding the location of at least one display board that includes eyewear satisfying the user's specified eyewear preference criteria.

5. The system of claim 1, wherein the system is adapted to use the at least one light to indicate that a particular pair of eyewear is on the incorrect shelf.

6. The system of claim 1, wherein the system is adapted to use the at least one light to indicate that a particular pair of eyewear should be placed on a particular shelf.

7. The system of claim 1, wherein the item tracking mechanism comprises a near field communications device.

8. The system of claim 1, wherein the system is adapted to provide the user with information about particular eyewear when the user picks up particular eyewear from a particular shelf.

9. The system of claim 1, wherein receiving the eyewear preference criteria from the user comprises receiving the eyewear preference criteria via a graphical user interface of the display board.

10. The system of claim 1, wherein receiving the eyewear preference criteria from the user comprises receiving the eyewear preference criteria from a mobile computing device associated with the user.

11. The system of claim 1, wherein each of the plurality of display shelves further comprises a plurality of indicators corresponding to a plurality of users such that identifying the particular eyewear that is played on the particular one of the display shelves that satisfies the eyewear preference criteria of the user comprises identifying the particular eyewear that is played on the particular one of the display shelves that satisfies the eyewear preference criteria of a first user using a first indicator of the plurality of indicators and identifying the particular eyewear that is played on the particular one of the display shelves that satisfies the eyewear preference criteria of a second user using a second indicator of the plurality of indicators.

* * * * *